United States Patent
Kim et al.

(10) Patent No.: US 7,635,103 B2
(45) Date of Patent: Dec. 22, 2009

(54) SEATBELT WEBBING LOCK PREVENTING APPARATUS

(75) Inventors: Jong-Kak Kim, Wonju (KR); Do-Shik Kim, Seoul (KR)

(73) Assignee: Delphi Korea Corporation, Troy, MI (US)

( * ) Notice: Subject to any disclaimer, the term of this patent is extended or adjusted under 35 U.S.C. 154(b) by 81 days.

(21) Appl. No.: 11/802,922

(22) Filed: May 25, 2007

(65) Prior Publication Data
US 2008/0029634 A1 Feb. 7, 2008

(30) Foreign Application Priority Data
May 25, 2006 (KR) .................... 10-2006-0046939

(51) Int. Cl.
*B60R 22/28* (2006.01)
(52) U.S. Cl. .................................. 242/379.1
(58) Field of Classification Search ............. 242/379.1; 280/805, 806; 297/470, 478
See application file for complete search history.

(56) References Cited

U.S. PATENT DOCUMENTS

| | | | | |
|---|---|---|---|---|
| 3,897,024 A | * | 7/1975 | Takada et al. | 242/383.4 |
| 3,907,227 A | * | 9/1975 | Takada | 242/383.4 |
| 4,036,322 A | * | 7/1977 | Takada et al. | 297/477 |
| 4,168,810 A | * | 9/1979 | Sack et al. | 242/383.2 |
| 4,948,066 A | | 8/1990 | Matsumoto et al. | 242/107.4 |
| 5,687,926 A | * | 11/1997 | Park et al. | 242/383.4 |
| 5,772,144 A | | 6/1998 | Tanabe et al. | 242/379.1 |
| 6,042,042 A | * | 3/2000 | Fujii et al. | 242/379.1 |
| 6,443,382 B1 | | 9/2002 | Bae | 242/382.6 |
| 6,499,554 B1 | | 12/2002 | Yano et al. | 180/268 |

* cited by examiner

*Primary Examiner*—Sang Kim
(74) *Attorney, Agent, or Firm*—Douglas D. Fekete

(57) ABSTRACT

The invention is related to a seatbelt webbing lock preventing apparatus enables a flywheel constituted as an inertia mass means to prevent a rotating lock of a lock mechanism followed by the webbing acceleration and deceleration of a seatbelt in any case of withdrawing the seatbelt from a retractor and rewinding it therein.

The webbing lock preventing apparatus comprises a webbing control portion 10 including a locking portion with a torsion bar mechanism for limiting a force applied to a seatbelt, a locking actuation mechanism provided with a flywheel for controlling the operating of the locking portion and stopping the rotating of a spool and the webbing of the seatbelt in accordance with the webbing acceleration and deceleration of the seatbelt caused by withdrawing the seatbelt from the retractor and rewinding it thereinto; and a flywheel rotating control portion including a friction spring mounted in a hub of the locking actuation mechanism, thereby preventing the flywheel from being rotated with its inertia force at the time of the acceleration or deceleration of the webbing.

4 Claims, 11 Drawing Sheets

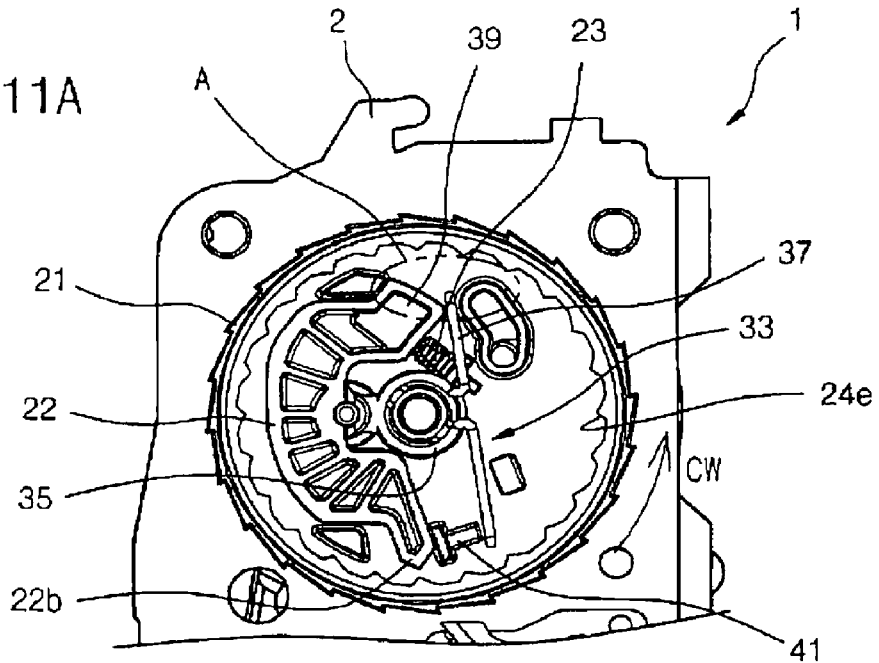
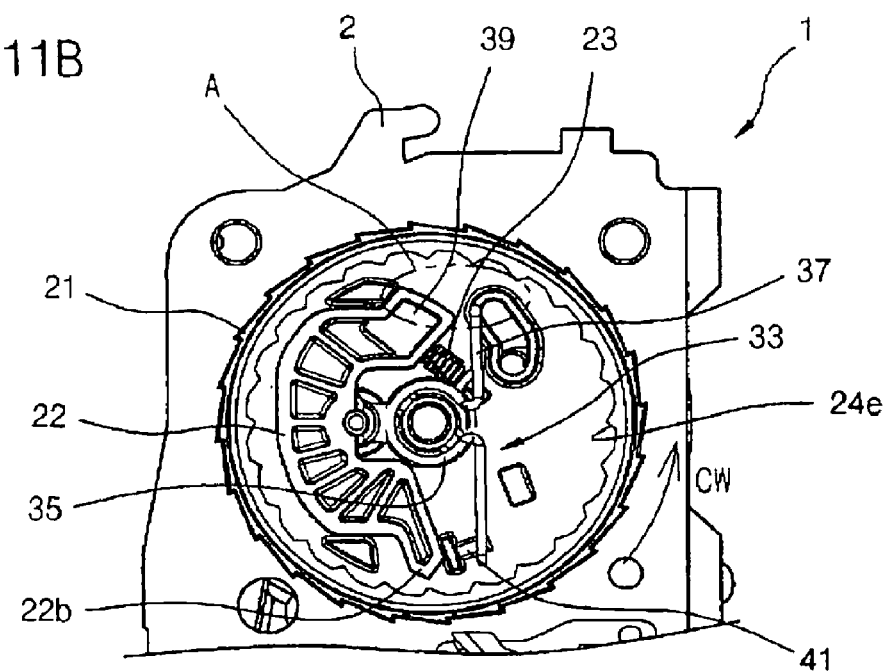

SEATBELT WEBBING LOCK PREVENTING APPARATUS

BACKGROUND OF THE INVENTION

The invention is related to a seatbelt retractor for a vehicle, and in particular, to a seatbelt webbing lock preventing apparatus of seatbelt retractor for enabling an inertia mass means to prevent the rotation locking of a lock mechanism followed by the webbing acceleration and deceleration of a seatbelt.

PRIOR ART

In general, a vehicle is equipped with a seatbelt safety device mounted on a seat to serve the safety of passengers including a driver. The seatbelt safety device includes a retractor for enabling a seatbelt of a strip type for restraining an occupant to rewind on/unwind from a spool and a buckle including a tongue removably inserted thereinto, which is fixed to one end of the seatbelt, in which the retractor protects a driver and passenger from being jumped forward or left out of the seat in the time of an abrupt deceleration or acceleration applied to the vehicle in the event of a collision or the like, and the buckle has the driver and passenger put on or off the seatbelt. In other word, the retractor permits the seatbelt to be withdrawn in a normal state, but on the contrary to inhibit the withdrawing thereof in an abnormal state by restraining the driver or passenger to be kept in an original position.

A typical vehicular seatbelt retractor including a retractor for controlling the winding and unwinding of a seatbelt as described above is disclosed in Korean Patent Application No. 1999-56259 corresponding to U.S. Pat. No. 6,443,382.

As shown in FIGS. 1, 2 and 3, the vehicular seatbelt retractor 101 comprises a fixing frame 103 formed in a U-shape in cross-section, a spool 105, a webbing control portion 107, a spring portion 109 and a vehicle sensor portion 111. The fixing frame 103 includes a rear wall 113 to be fixed to a vehicle's chassis and a pair of left and right foot portions 115 and 116 having openings formed at their center and integrally extended toward the front surface from both ends of the rear wall. The spool 105 comprises a winding portion 117 rotatably mounted to the frame 103, at least one flanges 120 integrally formed on both sides of the frame 103 to wind a seatbelt on the winding portion 117, a first sprocket 119 integrally formed on any one of the flange 120 and a shaft 121 integrally projected from the center of both ends surfaces of the winding portion 117.

A webbing control device 107 is subject to preventing the releasing of the seatbelt responding to the detection of the seatbelt acceleration in an abnormal condition and freely allowing the releasing of the webbing in a normal condition of a vehicle. The webbing control device 107 comprises a locking element 123 positioned on the right foot portion 116, a retainer 127 mounted adjacent the first sprocket 119 with the shaft 121 being passed through its center and including a hook ring 125 for enabling the locking element 123 to be pivoted, and a clutch wheel 135 coupled with the retainer 127 to enable the retainer 127 to be rotated.

The retainer 127 includes a retainer ring 129 formed in a ring shape on the inner circumference thereof, on the inner wall of which a second sprocket is formed in a tooth shape. The clutch wheel 135 includes an inertia mass body 133 having a rectangular shaft supporter mounted at the center.

As shown in FIG. 2, The inertia mass body 133 having rectangular shaft support to which the rotational force of the shaft 121 is transferred is constituted as a circular body integrated to the rectangular shaft support, which is provided with two wings 131 respectively extended from the lower portion along the semi-circular arc of the circumference thereof, at the end of which latches are formed to be engaged with the second sprocket. Also, the inertia mass body 133 includes a plurality of hooks (not shown) projected from the front surface of the circumference, so that it is inserted into an opening portion 149 formed at the center of the clutch wheel 135 to be engaged with the clutch wheel 135 as shown in FIG. 3. The clutch wheel 135 includes a first tooth portion 151 having a predetermined width on the inner circumference of the opening portion 149.

The webbing control portion 107 is supported on the spool shaft 121 of the spool 105 mounted on the fixing frame 103. The locking element 123 is mounted on the right foot portion 116. Then, the retainer 127 is inserted onto the shaft 121 to be mounted adjacent the sprocket 119 with the guide pin being positioned at the apex of the retainer ring 129. The clutch wheel 135 is inserted onto the shaft 121 with the inertia mass body 133 coupled therewith, in which the retainer ring 129 receives the first tooth portion 62 and the inertia mass body 133, and the latches of wings 131 is subject to be placed adjacent the second sprocket on the inner circumference of the retainer ring 129. This assembly configuration is shown in FIG. 3.

A vehicle sensor portion 111 comprises a housing 143 mounted on the lower portion of the left foot portion 116, a pawl lever 145 including an operating lever with a permanent magnet being positioned at the center to be engaged with the second tooth portion 137 of the clutch wheel 135 and a standing weight 147 constituted as a gravity mass and including a second permanent magnet of a ring type to generate a repelling force with respect to the first permanent magnet. The standing weight 147 is mounted in the housing 143 with the second permanent magnet being positioned against the first permanent magnet. Therefore, after assembling the pawl lever 145 in the housing 143, the pawl lever 145 is subject to be in position against the second permanent magnet. In an abnormal of the vehicle, as the stand weight 147 is slanted in any direction, the pawl lever 145 is moved upward due to the repelling force generated between the first and second permanents magnet. At the same time, the operating lever of the pawl lever 145 is operated in an inclined direction of the fixing frame 103 to be engaged with the tooth portion 137 of the clutch wheel 135. And, the webbing control portion 107 and the vehicle sensor portion 111 as described above are finished with being assembled in a cover 153.

A winding spring portion 109 comprises a spring 139 mounted on the opposite side of the webbing sensor portion 111 to be biased in the direction that the spool 105 winds the webbing and a cover 141 receiving the spring 139 and coupled with one end portion of the spool 105.

Therefore, the webbing control portion 107 detects the acceleration of the webbing. As shown in FIG. 2, the inertia mass body 133 is inserted onto the opening portion 149 of the clutch wheel 135 to engage the latches of the wings 131 with the first tooth portion 151. A normal state is one in which the inertia mass body 133 and the clutch wheel 135 are simultaneously rotated in the unwinding (releasing) direction C or the winding direction D. However, at time of the webbing acceleration the inertia mass body 133 is instantly rotated in the webbing releasing direction C, while the clutch wheel 135 is also rotated by its inertia force, the latches of the wings 131 pass over the tops of the teeth of the first tooth portion 151, so its ends are hung on the second sprocket of the retainer ring 129 due to their centrifugal force. At that time, the rotational force of the shaft 121 rotates the retainer 127 in the direction of arrow F, as shown in FIG. 3. At the same time, the locking portion 123 of the retainer 127 forces the latches to be engaged with the first sprocket so as to stop the further rotation of the spool 105 and prevent the releasing of the webbing. Simultaneously, as the releasing force of the webbing pulls the rotating stopped spool 105 in a webbing direction (to a frame or opening upper portion), the frictional tooth portions 114 respectively formed on the opening portions of the left and right foot portions 115 and 116 become engaged with the flanges 120 of the spool 105 to assure the prevention of the further rotation of the spool 20.

Therefore, the webbing control device 100 adapted to a general vehicle seatbelt retractor detects the abrupt acceleration or deceleration of the webbing at the time of rewinding or winding the seatbelt from the retractor to perform the webbing of the seatbelt. But, this abrupt webbing may cause a temporary or instant stop error operating of the webbing against a releasing or pulling direction A of the seatbelt. At that time, it accompanies with troublesome that the seatbelt is readjusted in order to remove this error operating.

Furthermore, if the seatbelt is subject to passing through a height adjustment at a predetermined position of a pillar in the vehicle, the height adjustment may be escaped from its original position mounted due to the greater force instantly applied thereto according to the webbing acceleration or deceleration of the seatbelt, thereby causing an error in the releasing or pulling of the seatbelt.

Another typical example of a conventional technology is disclosed in U.S. Pat. No. 6,499,554 entitled "Seat Belt Retractor". The patent '554 discloses a webbing control portion 210 comprising a lock actuating mechanism 206 that is corresponded to the webbing control portion 105 as described above.

As shown in FIG. 4, the webbing control portion 210 comprises a locking portion 205 provided on one side of the frame 2 and including a torsion bar mechanism 207 for limiting a force applied to a seatbelt 203 and the lock actuating mechanism 206 for actuating the locking portion 205, so that the rotating of a seatbelt spool 204 is stopped to interrupt the releasing of the seatbelt 203 when the releasing acceleration of the seatbelt 203 to be detected is over a predetermined value.

The webbing control portion 210 including a webbing sensing and lock actuating mechanisms for detecting the releasing acceleration of the seatbelt to stop the rotating of the spool will be described as follows:

The locking portion 205 comprises a locking base 219, the front surface of which is a disc form provided with a through hole axially piecing the center thereof. The locking base 219 includes a hole for rotatably supporting a locking pawl 220 and a threaded shaft portion projected from one side thereof to be rotated with the spool 204 by a torque transmitted from the spool 204. The locking portion 205 further comprises a torsion bar 226 and a cylindrical stop 227 screwed onto the threaded shaft portion of the locking base 219. The torsion bar 226 comprises a first torque transmitting portion provided on the side of a lock gear 221 and having a regular hexagonal shape in a cross section to be fitted into the hole of regular hexagonal cross section formed on the locking base 219 so as not to rotate with respect to the locking base 219, a flange portion provided on the end of the first torque transmitting portion 226b, and a second torque transmitting portion with a regular hexagonal cross sectional shape provided on the other end of the torsion bar 226 and including a first shaft portion concentrically extended therefrom. The cylindrical stopper 227 is engaged with the locking base 219 to be rotated with the seatbelt spool 204 as an integral unit and axially movable with respect to the seatbelt spool 204.

The lock actuating mechanism 206 comprises a lock gear 221 having a number of teeth formed on the outer periphery thereof, a flywheel 222 pivotally mounted on a supporting shaft of the lock gear 221 and including a stop claw 222b formed on the tip thereof, a flywheel compressing spring 223 compressively mounted between the lock gear 221 and the flywheel 222, a first retainer 224 removably fixed on the side wall of the frame 202, and a pawl spring 225 compressively mounted between the locking base 219 and the lock gear 221.

In addition to the webbing control portion 210, the seatbelt retractor 201 comprises a frame 202, a reel or shaft 204 for winding the seatbelt 203, a speed reduction detecting means 208 for detecting the speed reduction of the vehicle, a motor 212 for generating a rotational torque, a power transmission gear mechanism 211 for transmitting a rotational torque of the motor 212, a speed reducing mechanism 212 including at least one planetary gear and idle gear and a carrier rotatably supporting these planetary and idle gears to reduce the speed of a rotational torque of the motor 212 transmitted from the power transmission gear mechanism 211 and transmitting it to the spool 204, a power transmission path switching mechanism 213 for selectively switching to one of the state in which a rotational torque of the motor 212 is transmitted to the spool 204 and the state in which the rotation of the motor 212 is not transmitted to the spool 204, and a spring portion 214 for urging the spool 204 in the winding direction of the seat belt 203. The spring portion 214 comprises a spring cover 255 mounted to the outer side thereof receiving a return spring 254, in which a bush 253 is rotatably supported within the supporting hole of the spring portion 214 and supports the first shaft portion of the torsion bar 226, an internal gear 244 having a tooth portion engaged with the planetary gears and idle gears being properly arranged in an inner space thereof, a speed reduction gear 245 positioned in the inner space thereof to be engaged with the power transmission gear mechanism 211 and a sun gear 43 engaged with the internal speed reduction gear of the speed reduction gear 245, the detailed description of which will be omitted because of having not the direct relation with the invention.

The seatbelt retractor 201 as described above is operated as follows. First, when the seat belt is unwound for withdrawal at the normal speed, the spool 204 rotates in the clockwise direction CW. As shown in FIG. 5, the torsion bar 226 coaxially connected to the spool 204 is simultaneously rotated through a second carrier 256, into which the torque transmitting portion 226d is inserted. Also, the locking gear 221 installed on the right portion of the torsion bar 226 as shown in FIG. 6 rotates along with the torsion bar 226 in the clockwise direction CW at the normal state of FIG. 7.

On the contrary, when the vehicle is abruptly stopped at the state of a passenger wearing the seatbelt 203, the seatbelt 203 tends to be drawn out at a rapid speed by the forward inertia of the passenger. At the same time, since the lock gear 221 is subject to accelerate the rotation in the clockwise direction CW, the flywheel 222, which is constituted as inertia mass freely and rotatably mounted in the lock gear 221, rotates in a counter clockwise CCW compressing the compress spring 223 by its inertia force as shown in FIG. 8. Therefore, the stop claw 222b is engaged with an inner tooth 224e of the first retainer 224 to stop the rotation of the lock gear 221. Then, a relative rotation between the torsion bar 206, which is subject to be not rotated along with the lock gear 221, and the lock base 219 happens. For it, the locking pawl 220 is pivotally moved to engage with an internal tooth 218a and the rotating of the spool 2004 in a counter clockwise direction CCW is stopped along with the further unwinding of the seatbelt, thereby safely securing/protecting the passenger on the seat.

On the other hand, the flywheel 222 detects the acceleration of the webbing, which is a good function for preventing the withdrawal of the seatbelt 203 at the time of the sudden stop of the vehicle, but it is often used to temporally prevent the releasing of the seatbelt unnecessarily at the state that a webbing speed over a predetermined level of acceleration is not detected. It requires for readjusting the speed of the webbing by adjusting the height adjustment, etc.

On the contrary, at the time of terminating the withdrawal of the seatbelt 203, as a bad function of the retractor the temporary seatbelt stopping happens. That is why the flywheel 222 relatively rotates in a counter clockwise direction CCW with its inertia force followed by the speed reduction occurred at the lock gear 221 at that time, so that the stop claw 22b is engaged with the inner tooth 224e of the first retainer 224. It happens a problem in making inconvenient to the use of the seatbelt.

As shown in FIG. 9, even if the seatbelt retractor 201 is adopted with a height adjustment apparatus 251, a supporting member 257 may be dropped down from its original fixing position in a dotted line to a position shown in a gothic line, when an exceeding force is applied to the seatbelt 203 for withdrawal in the process of coupling a belt tongue 253 into a buckle apparatus 255. At that time, the seatbelt 203 is wound into the retractor 201 by a distance dropped. Even in that case, as the seatbelt 203 is wound into the retractor 201 in a reduced speed and stopped at around its termination, the speed reduction happened at the lock gear 221 as shown in FIG. 8 makes the stop claw 222b of the flywheel 222 to be engaged with the inner tooth 224e of the first retainer 224, thereby resulting from the interruption of the withdrawing of the seatbelt 203. It has a problem in that it puts inconvenience to the use of the seatbelt 203.

In order to resolve these and those problems and disadvantages, an object of the invention is to provide a webbing lock preventing apparatus of a seatbelt retractor comprising a webbing control portion for enabling an inertia mass means to prevent the rotation locking of a locking actuation mechanism according to the acceleration and decelerations at the time of withdrawing a seatbelt from a retractor or rewinding it therein.

The other object of the invention is to provide a webbing lock preventing apparatus of a seatbelt retractor comprising an elastic means such as a friction spring mounted in a lock gear to allow an inertia mass means to be relatively rotated only at the time of performing a good function to abruptly stop the webbing withdrawal at a sudden breaking of a vehicle and on the contrary to restrain the inertia rotation of an inertia mass means when causing a bad function to temporally stop a seatbelt at around a time of terminating rewinding the seatbelt into a retractor, thereby improving its use convenience without spoiling the inherent safety of the retractor.

SUMMARY OF THE INVENTION

In order to accomplish these objects, according to the invention a webbing lock preventing apparatus of a seatbelt retractor comprises a webbing control portion. In detail, the webbing lock preventing apparatus comprises the webbing control portion which includes a locking portion provided with a torsion bar mechanism for limiting a force applied to a seatbelt and a locking actuation mechanism for operating the locking portion; and a flywheel rotating control portion for controlling the rotation of the flywheel at below a certain value of an acceleration or deceleration detected according to the withdrawal and rewinding of the seatbelt and preventing the rotation of a spool, thereby preventing the stopping of the withdrawing and rewinding of the seatbelt.

The webbing lock preventing apparatus comprises a webbing control portion including a locking portion provided with a locking base having a front portion constituted as a disk and a pawl; and a locking actuation mechanism provided with a lock gear having a plurality of teeth formed on the outer circumference thereof, a flywheel rotatably pivoted on the supporting shaft of the lock gear, a flywheel compressive spring compressively mounted between the lock gear and the flywheel, a retainer removably mounted on the wall portion of a frame to receive the lock gear and the flywheel, and a pawl spring compressively mounted between the locking base and the lock gear; and a flywheel rotation control portion including a friction spring such as an elastic means for preventing the vibration of the flywheel by the inertia force of the flywheel and supporting the flywheel to be placed in its original position, in which the locking portion further included a torsion bar mechanism.

BRIEF DESCRIPTION OF THE DRAWINGS

The invention will be described in detail with reference to the attached drawings, in which:

FIG. 11A to 11C are front views illustrating the operating of a flywheel constituted as an inertia mass means at the time of withdrawing a seatbelt according to the invention; and, FIG. 12A to 12C are front views illustrating the operating of the flywheel constituted as an inertia mass means at the time of rewinding the seatbelt according to the invention.

DETAILED DESCRIPTION OF THE INVENTION

Figure 1:
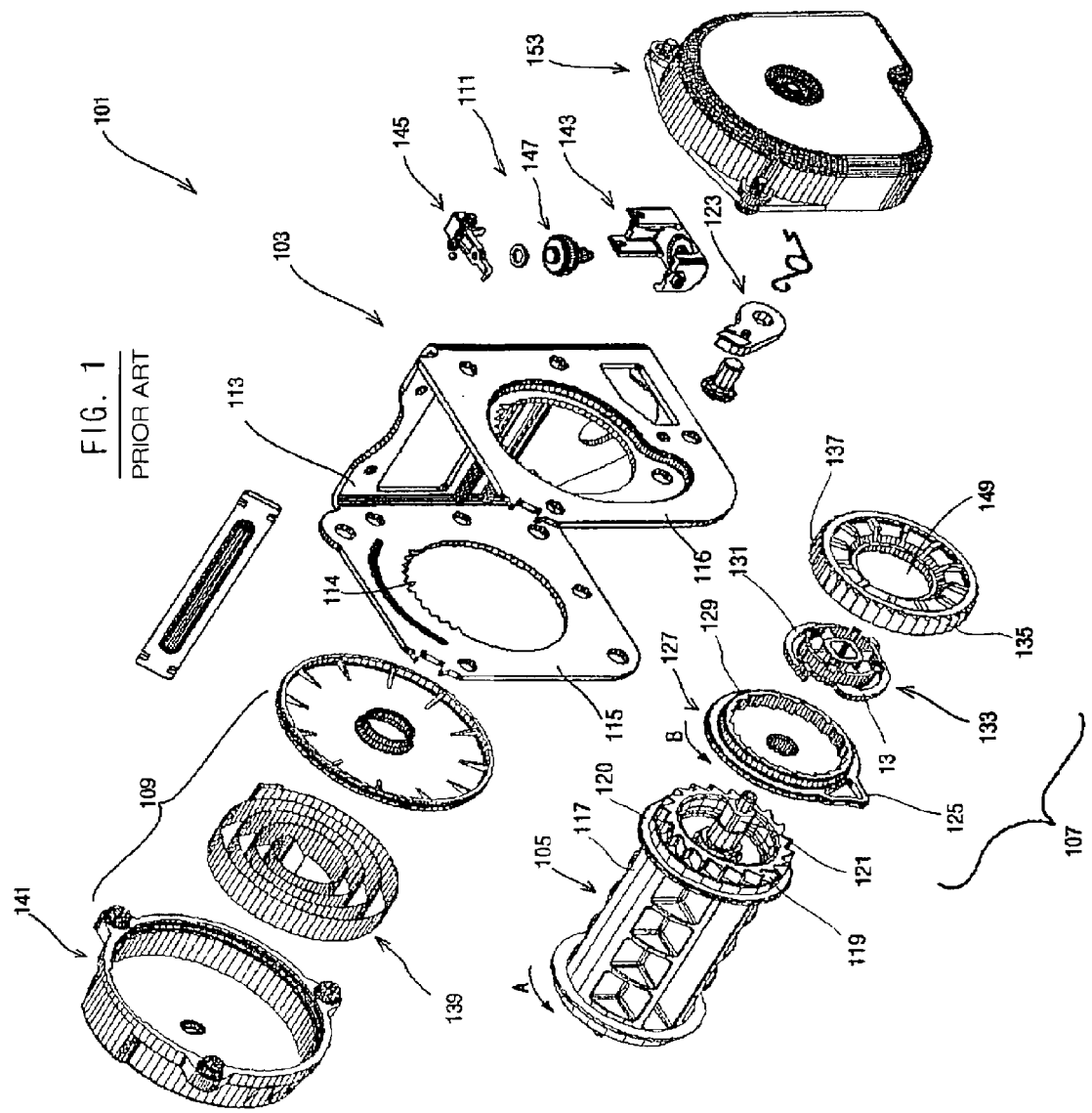
FIG. 1 is an exploded perspective view illustrating a conventional seatbelt retractor.
Figure 2:
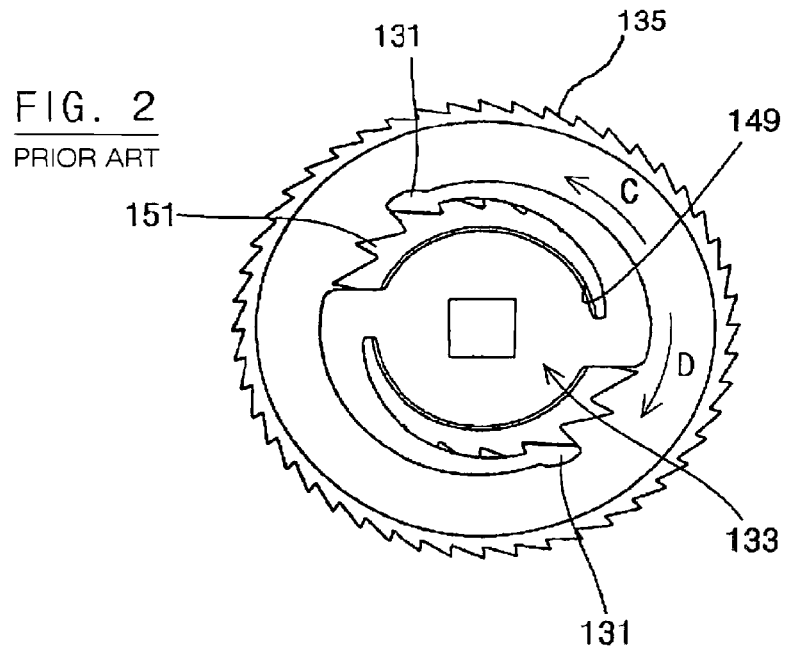
FIG. 2 is a rear view illustrating the coupling relationship of an inertia mass and a clutch as shown in FIG. 1.
Figure 3:
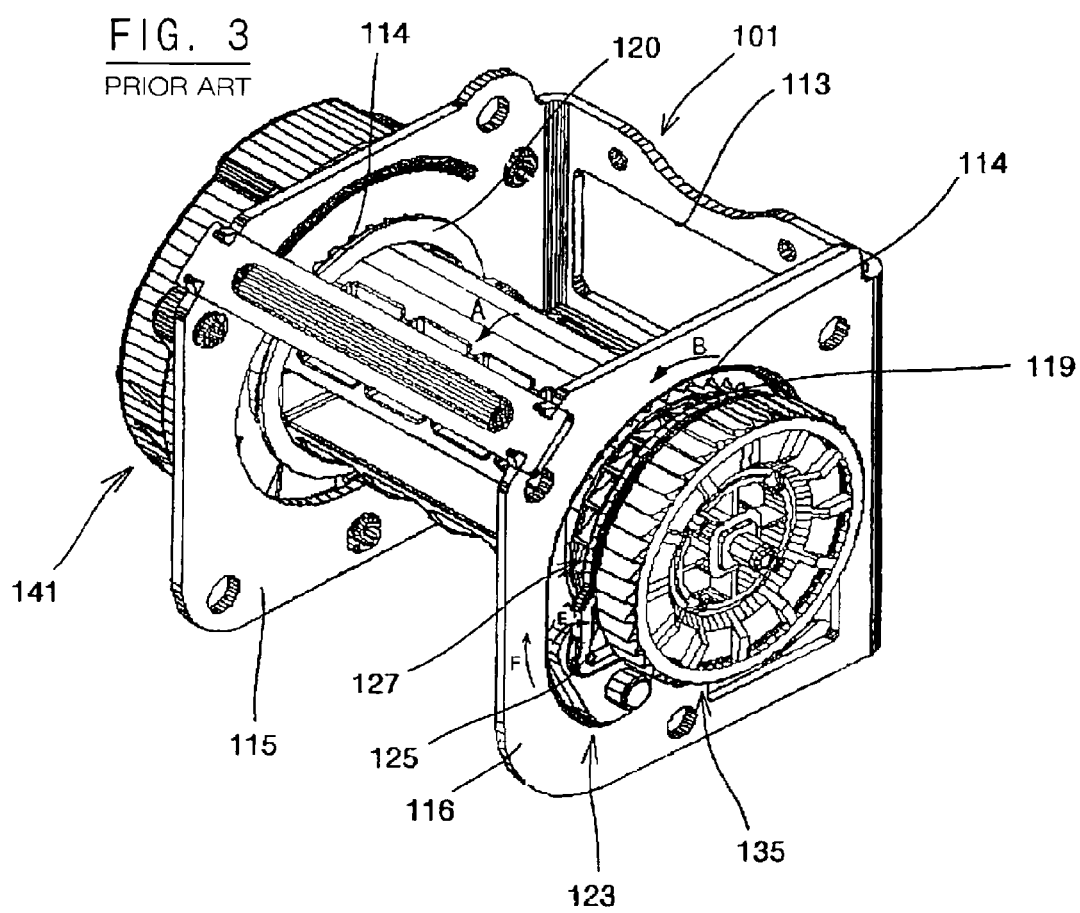
FIG. 3 is a perspective view illustrating the assembly of the seatbelt retractor assembled as shown in FIG. 1.
Figure 4:
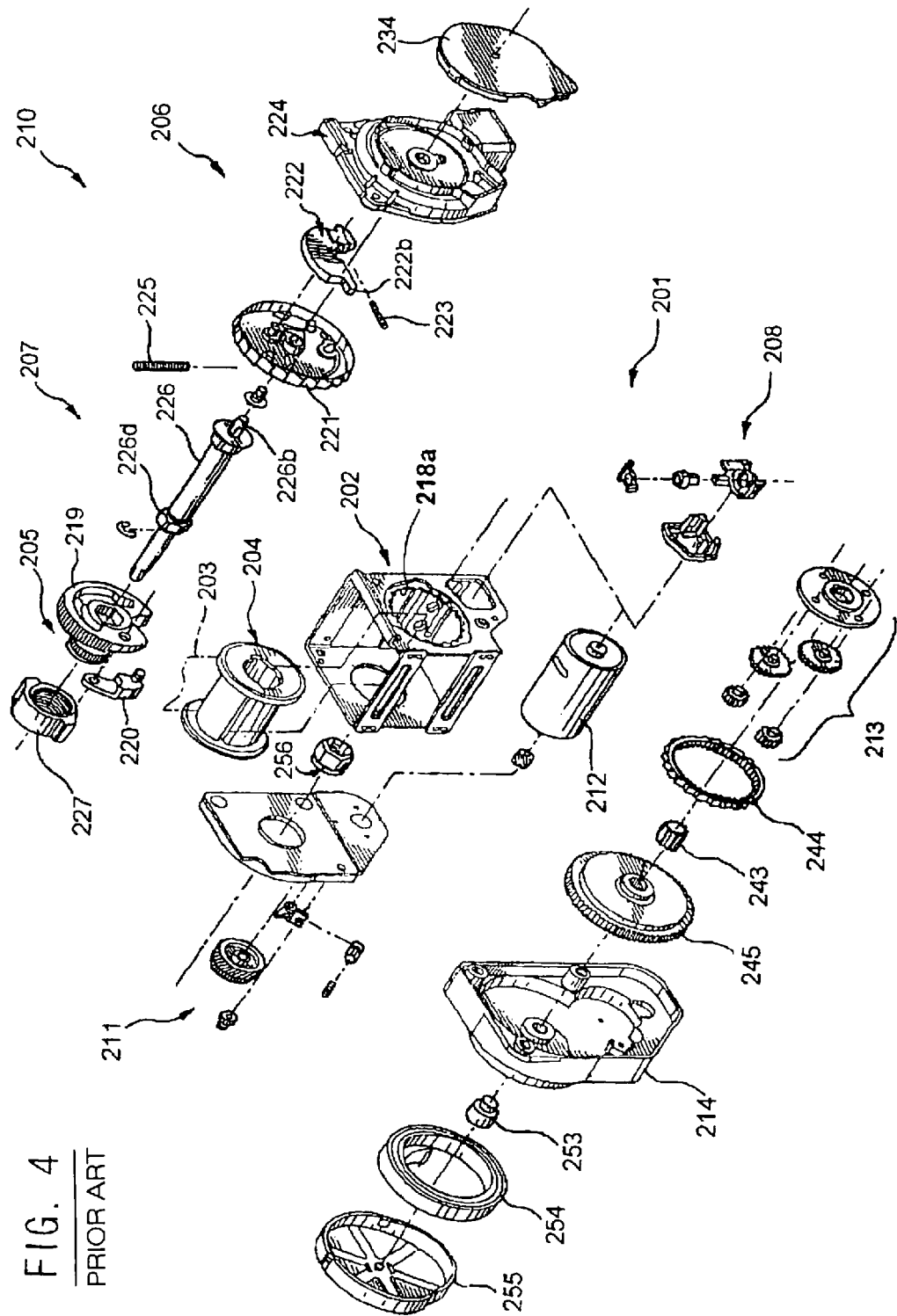
FIG. 4 is an exploded perspective view illustrating another conventional seatbelt retractor.
Figure 6:
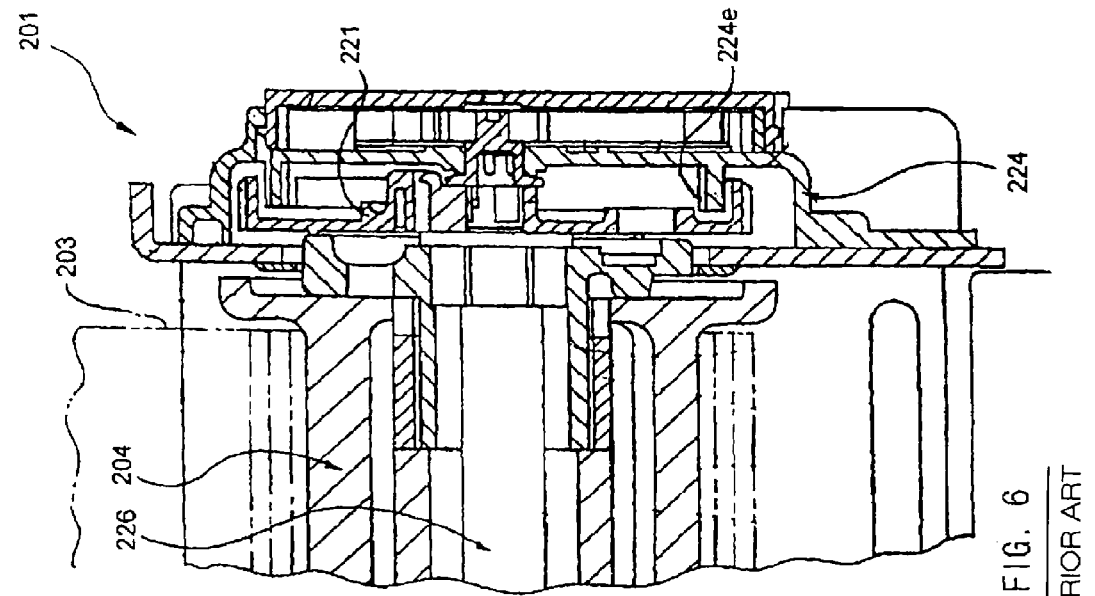
FIG. 6 is a partially longitudinal cross-sectional view of a left portion illustrating the seatbelt retractor as shown in FIG. 4.
Figure 5:
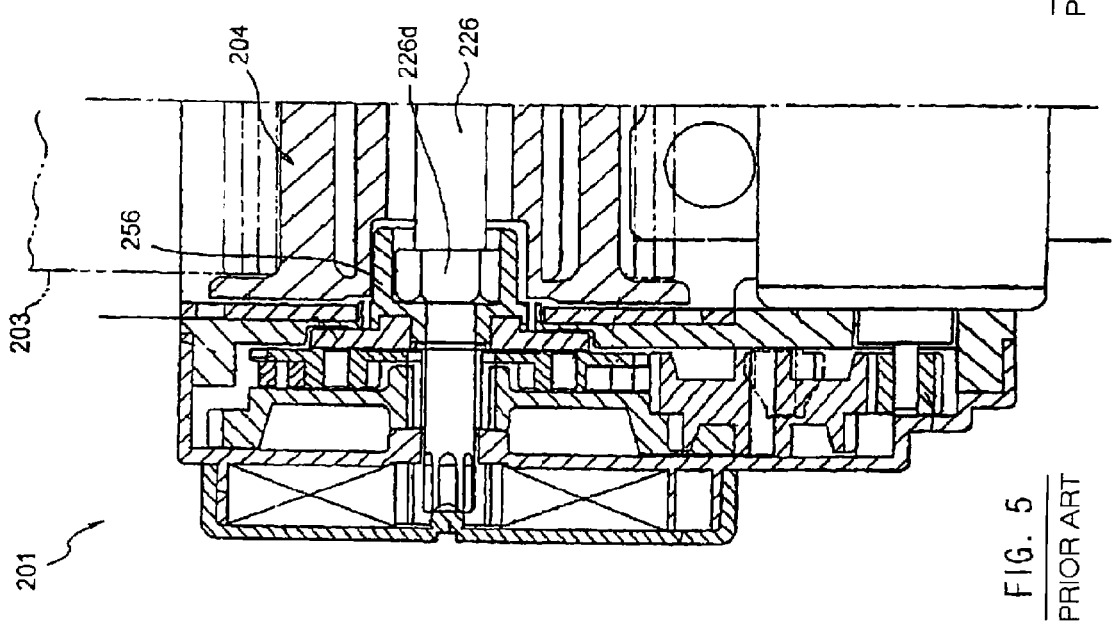
FIG. 5 is a partially longitudinal cross-sectional view of a right portion illustrating the seatbelt retractor as shown in FIG. 4.
Figure 7:
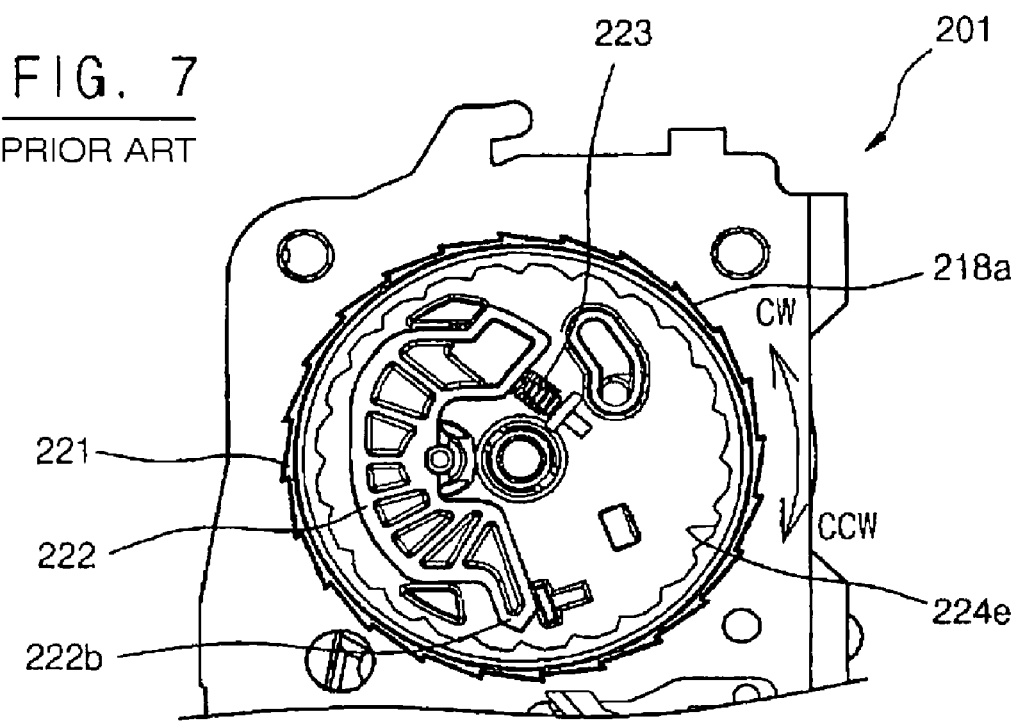
FIG. 7 is a front view illustrating a normal state of an inertia mass as shown in FIG. 4.
Figure 8:
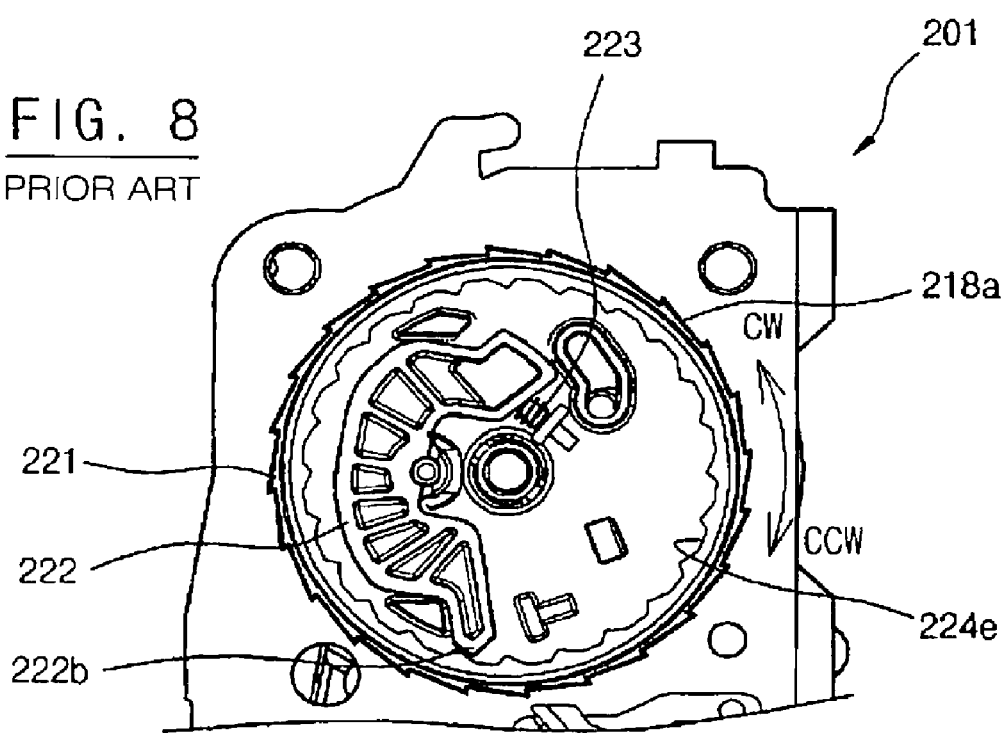
FIG. 8 is a front view illustrating a hanging state of the inertia mass in FIG. 4.
Figure 9:
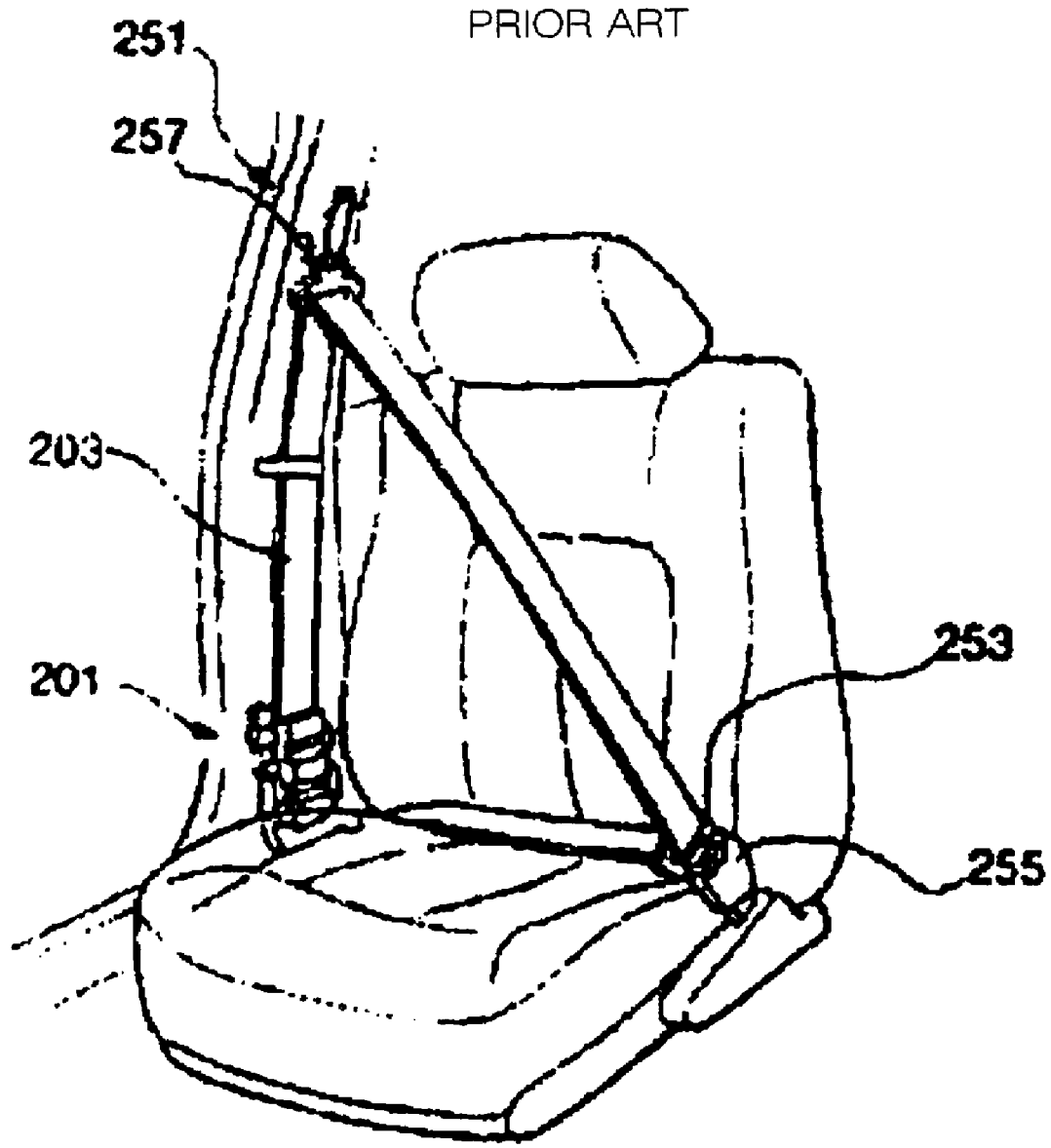
FIG. 9 is a perspective view illustrating the conventional seatbelt retractor to which a seatbelt height adjusting apparatus is adopted.

The invention refers to a webbing lock preventing apparatus adapted to a seatbelt retractor disclosed in U.S. Pat. No. 6,449,554 as one of embodiment according to its principal thereof, but can be applied to a vehicular seatbelt retractor disclosed in U.S. Pat. No. 6,443,383. Herein, it is noted that the description of a spring portion 5, a seatbelt 3, a spool 4 for winding the seatbelt and a power generating portion assembled together with them will be omitted for avoiding the overlapping of their explanation.

As shown in FIGS. 10A to 12C, a webbing lock preventing apparatus 1 comprises a webbing control portion 10 including a locking portion 8 provided with a locking base 11, a pawl 15 and a torsion bar mechanism 7 for limiting a force applied to a seatbelt; and a locking actuation mechanism 9 mounted in a retainer 24 along with the locking portion 8, in which the retainer 24 is removably mounted to the wall portion of a frame.

The locking portion 8 is provided with a locking base 11 having a front portion constituted as a disk. The locking base 11 includes a threaded shaft portion 11a projected from the one side thereof to be connected with a spool 4 and rotated by a torque transferred therefrom as describe below in detail, a boss 11b projected in a certain height from the center thereof, a lock plate 13 formed to mount the pawl 15 onto the locking base 11 and prevent the removal of the pawl 15 and a hole (not shown) formed to pivotally support the pawl 15, into which a pin 15a is fitted. The locking portion 8 further comprises a torsion bar mechanism 7 which includes a bar portion coupled into the spool 4, a first transferring portion 7b provided with a gear portion formed in a certain width on the circumference of one end thereof and engaged into the through-hole of the locking base 11 and a second torque transferring portion 7c provided with another gear portion formed in a certain width on the circumference of the other end thereof to get the bar portion 7a to function as the center shaft of the spool 4.

The locking actuation mechanism 9 includes a lock gear 21 having a plurality of teeth formed on the outer circumference thereof, a flywheel 22 rotatably pivoted on the supporting shaft of the lock gear 21, a flywheel compressive spring 23 compressively mounted between the lock gear 21 and the flywheel 22, and a pawl spring 25 compressively mounted between the locking base 11 and the lock gear 21. The lock gear 21 includes a hub 31 projected in a certain height from the center thereof and having a through-hole pierced to allow the boss 11b of the lock gear 11 to be fitted thereinto. The flywheel 22 includes a head portion 39 formed at the upper portion thereof as an inertia mass and a latch 22b formed at the lower portion thereof to restrain the further rotation of the spool at the time of the abrupt acceleration or deceleration of the webbing. The flywheel 22 is mounted adjacent the hub 31 to be vibrated like a pendulum.

The webbing lock preventing apparatus 1 further comprises a flywheel rotation control portion 36 that includes a friction spring 33 such as a wire spring or leaf spring, etc. as an elastic means for preventing the vibration of the flywheel 22 by the inertia force of the flywheel 22 and supporting the flywheel 22 to be placed in its original position, a hanging projector 41 projected from one surface of the lock gear 21 to support one end of the friction spring 33 and a stop plug 34 engaged with the boss 11b projected from the hub 31 of the lock gear 21 to enable the operating control of the flywheel 22.

Figure 10A:
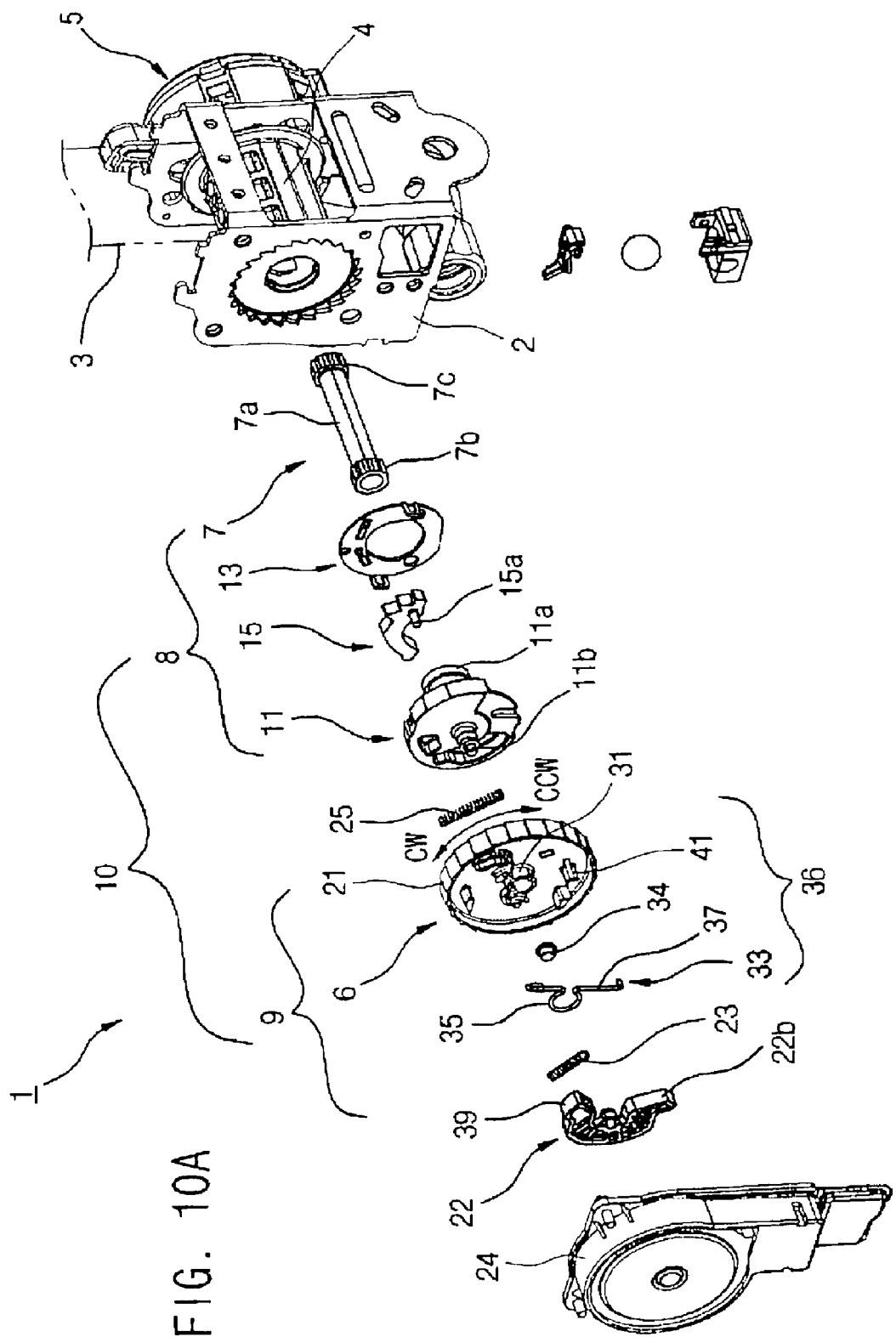
FIG. 10A is an exploded perspective view illustrating a seatbelt retractor including a webbing control portion to which a friction spring is mounted according to the invention.
Figure 10B:
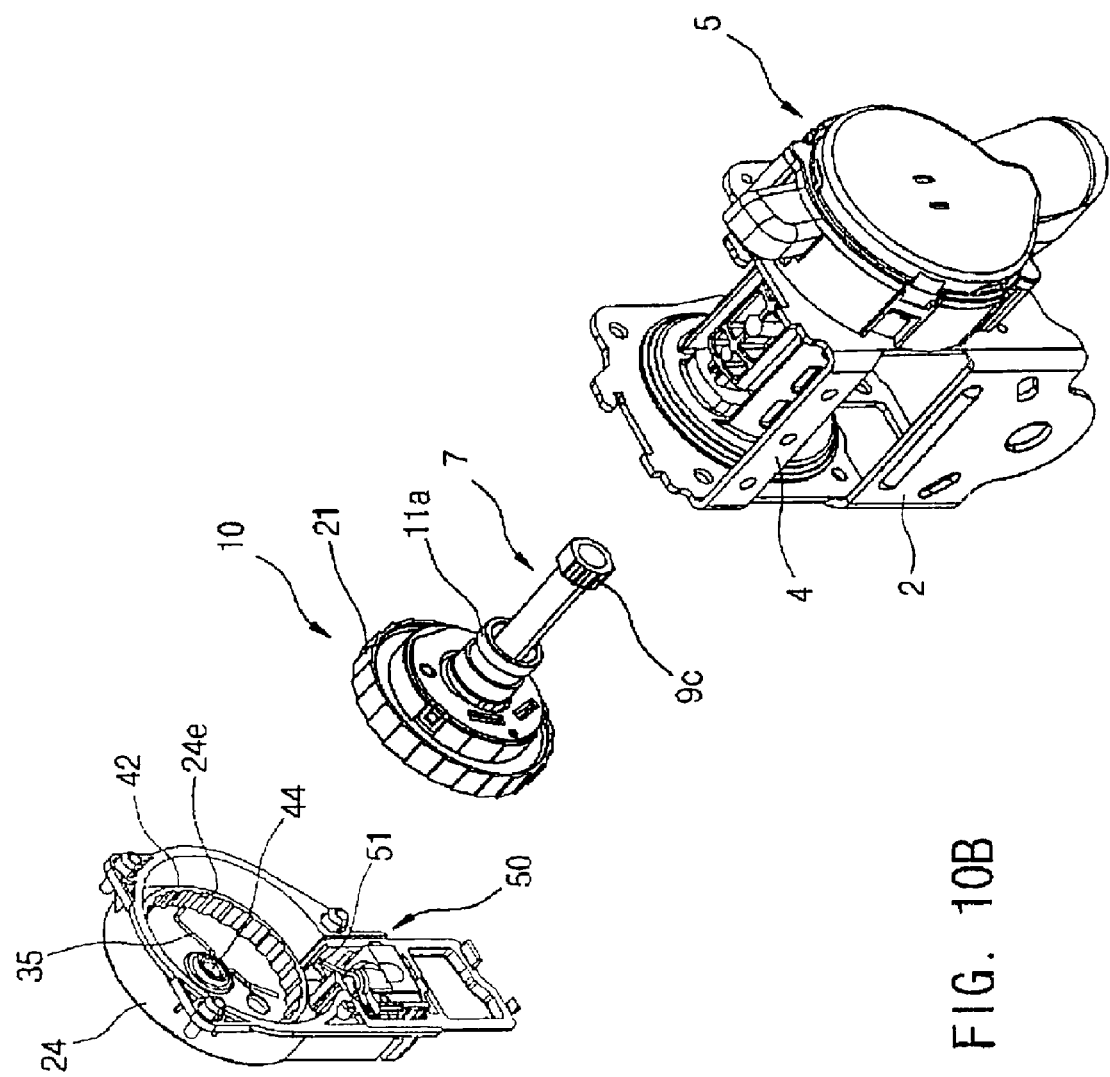
FIG. 10B is an exploded perspective view illustrating the seatbelt retractor including the webbing control portion in which a locking portion is assembled in parts and a flywheel rotation control portion is separated in parts according to the invention.

As shown in FIG. 10B, a retainer 24 is configured to receive the webbing control portion 10. For example, the retainer 24 includes a ring portion 42 formed as a circular wall that is spaced away in a certain gap from the outer circular wall thereof, in which the ring portion 42 includes an inner tooth portion 24e having a plurality of teeth formed on the inner circumference thereof, and a supporting portion 44 projected from the center to position a coupling portion 35 of the friction spring 33 on the circumference thereof and including a fitting groove formed at the center, into which the stop plug 34 is fitted. And, a vehicle-sensing portion 50 including a pawl level 51 is mounted below the ring portion 42 in a same method as that of a prior art. Therefore, when the webbing control portion 10 is assembled into the retainer 24, a circumference wall of the lock gear 21 is positioned in the gap formed between the ring portion 42 and the inner circumference wall of the retainer 24, while the pawl lever 51 is faced against the tooth portion on the outer circumference of the lock gear 21.

On the other hand, as shown in FIGS. 11A to 12C, the friction spring 33 functions as a type of torsion spring in the form of a symbol Ω of Ohm and includes a coupling portion 35 supported onto the supporting portion 44 by the stop plug 34 and pressing portions 37 extended in opposite directions from both ends of the coupling portion 35. The coupling portion 35 is formed as a ring, one part of which is separated and opened. The coupling portion 35 is inserted onto the outer circumference of the supporting portion 44 and supported by the stop plug 34 to be engaged with the boss 11b that is projected from the hub 31 at the center of the lock gear 21. Also, the pressing portions 37 are extended from both ends of the coupling portion 35 to selectively contact with the head portion 39 of the flywheel 22 or a hanging projector 41 formed on one side surface of the lock gear 21.

Accordingly, the flywheel control portion including the friction spring 33 enables the lock gear 21 to be normally operated even at the moment that the seatbelt 3 is abruptly withdrawn due to the sudden breaking of the vehicle.

Figure 11C:
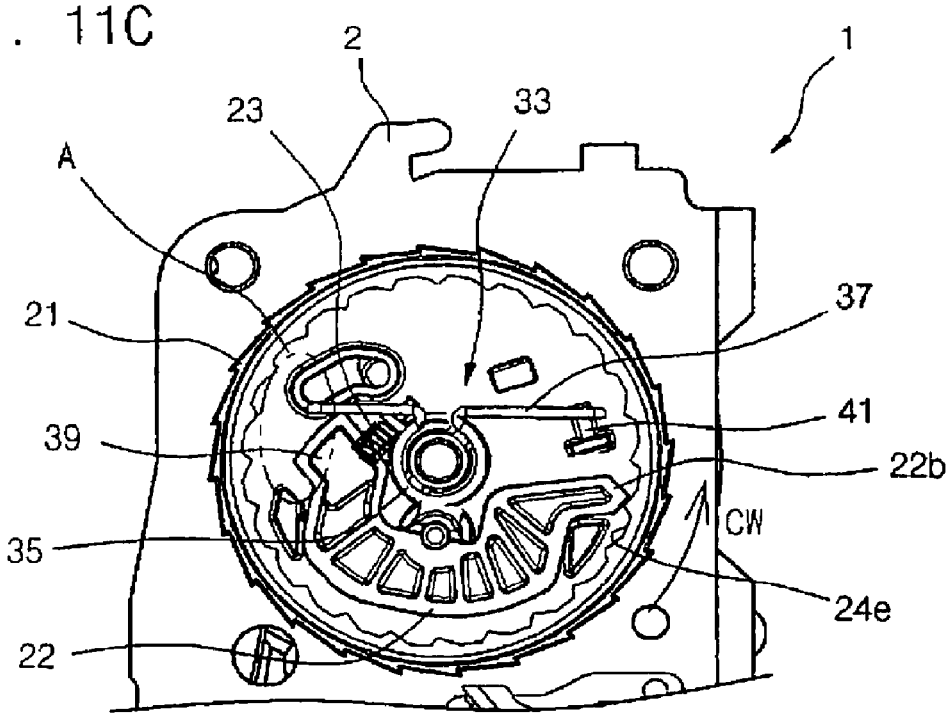

In other words, as shown in a dotted line A in FIG. 11b, even at the webbing acceleration causing the rotating acceleration of the lock gear 21, there is secured a sufficient gap between the head portion 39 of the flywheel 22 functioning as an inertia mass and the pressing portion 37 of the friction spring 33. As shown in FIG. 11C, the latch 22b is engaged with the inner tooth portion 24e of the ring portion 42 so that the seatbelt 3 is normally withdrawn or wound, even through the flywheel 22 is rotated by its inertia force without being endowed any effect from the friction spring 33.

Thereafter, as the rotating acceleration of the lock gear 21 is released, the flywheel 22 rotates in a clockwise direction CW responsive to the repelling force of the spring 23 faced to the head portion 39, so that the latch 22b is released from the inner tooth portion 24e. At that time, as shown in a dotted line A in FIG. 11B, the gap between the head portion 39 and the friction spring 33 is formed because the friction spring 33 rotates in a counter clockwise direction CCW by an inertia force generated at the time that the lock gear 21 rotates at a high speed in a clockwise direction CW for wearing the seatbelt 3 in a state of FIG. 11A.

Figure 12A:
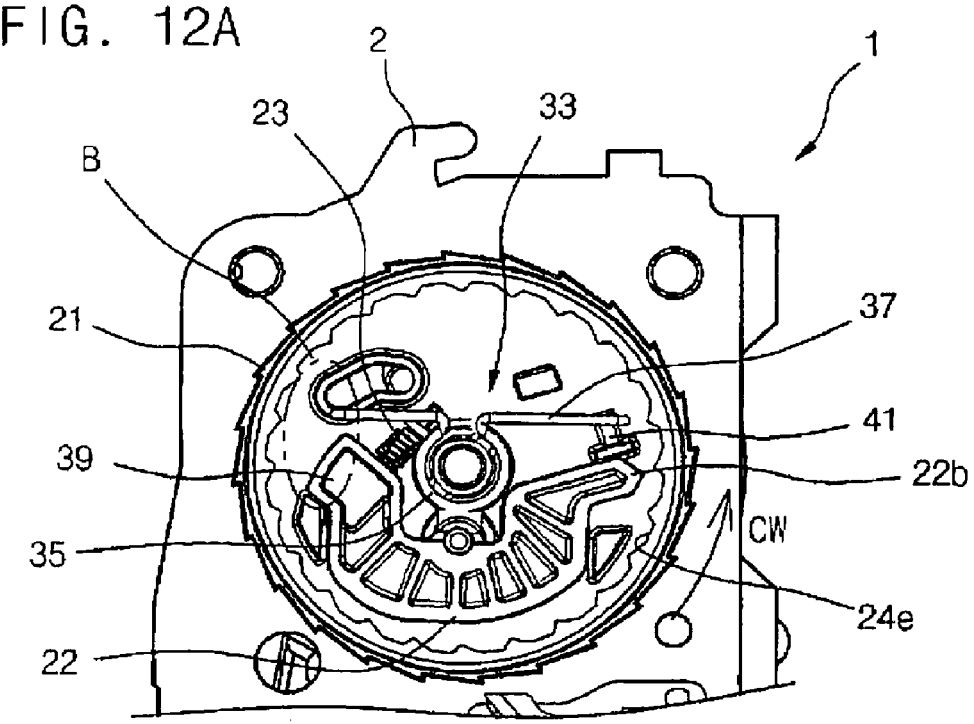
Figure 12B:
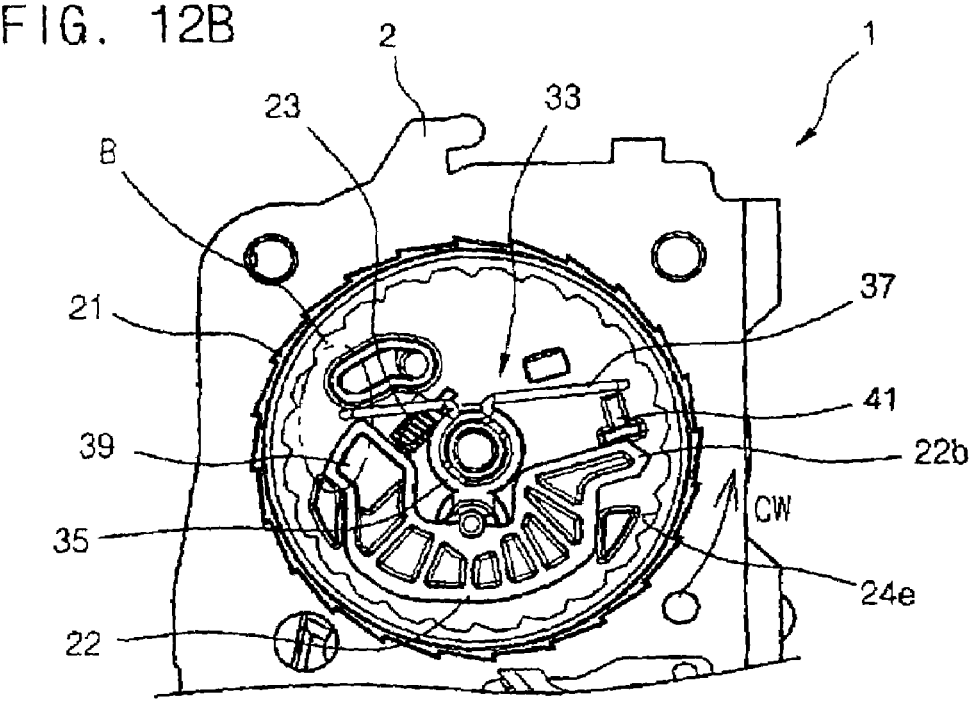
Figure 12C:
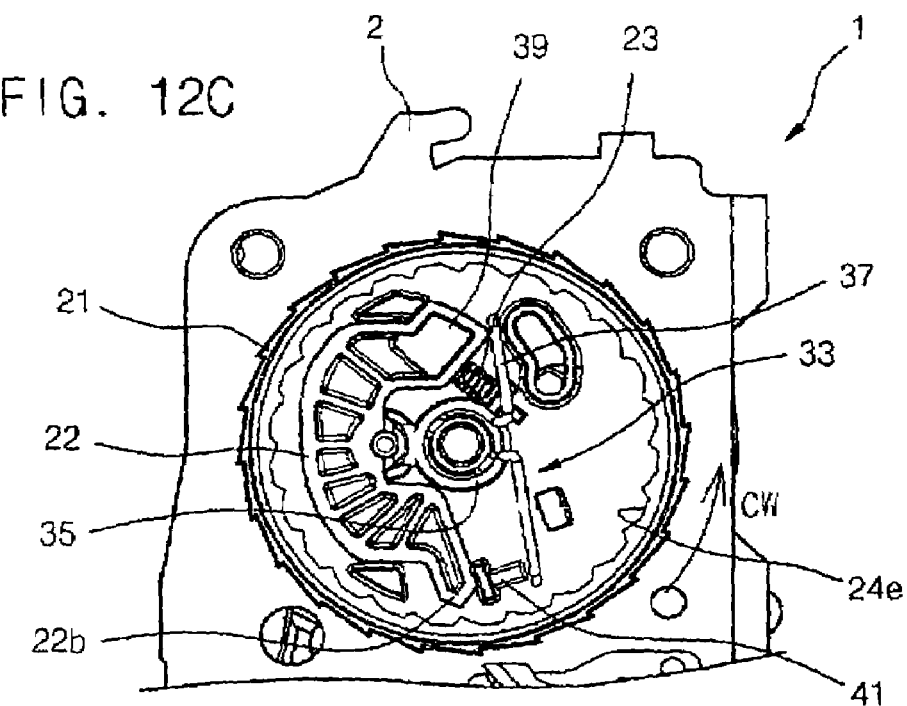

On the contrary, the spool 4 rotates at a reduced speed at around the time of terminating the rewinding of the seatbelt 3 in a counter clockwise direction CCW. Then, the lock gear 21 also rotates at the reduced speed in a counter clockwise direction CCW. Following with it, the flywheel 22 has a tendency to rotate in a counter clockwise direction CCW by its inertia force, but its rotation is prevented with the head portion 39 hanging on the pressing portion 37, as shown in a dotted line B in FIG. 12B. Therefore, as shown in FIG. 12C, the latch 22b can't be engaged with the inner tooth portion 24e of the ring portion 42, thereby preventing the operating for hindering the rewinding of the seatbelt onto the spool at around its terminating time. And then, as shown in a dotted line B in FIG. 12B, there is not formed a gap between the head portion 39 and the friction spring 33, because the friction spring 33 rotates in a clockwise direction by an inertia force of the flywheel 22 generated at the time that the seatbelt starts to be rewound into the retractor in a high speed in a counter clockwise direction after being released from a buckle at the state of FIG. 12A.

Acting Effect

As described above, according to the invention a seatbelt webbing lock preventing apparatus prevents a flywheel from being the rotation locking of a locking actuation mechanism according to the acceleration or deceleration of the webbing caused at the time of withdrawing the seatbelt from a retractor or rewinding it thereinto. Especially, the flywheel is allowed to rotate by its inertia force only at the time of performing its good function of stopping the withdrawing of the seatbelt at a sudden braking of a vehicle, and on the contrary restricted to stop its inertia rotation at the time that a bad function causing the webbing stopping of the seatbelt approaching a time point of terminating the rewinding of the seatbelt. Therefore, it is known that the invention enhances the use convenience with the safety of a seatbelt retractor being kept in an inherent original state.

What is claimed is:

1. A seat belt webbing lock preventing apparatus of a seatbelt retractor, said seatbelt retractor comprising a spool and a webbing disposed about the spool, said seat belt webbing lock preventing apparatus comprising;

a webbing control portion comprising a locking portion and a locking actuation mechanism for operating the locking portion;

said locking portion comprising a torsion bar mechanism for limiting a force applied to a seatbelt, a locking base coupled to the torsion bar, and a pawl disposed on the locking base;

said locking actuation mechanism comprising a lock gear, a pawl spring compressively mounted between the locking base and the lock gear; a flywheel pivotally mounted onto the lock gear; a flywheel compressive spring biasing the flywheel relative to the lock gear; and a flywheel rotation control portion comprising a retainer and a friction spring mounted on the retainer and engaging the flywheel to reduce movement of the flywheel at below a certain value of an acceleration or deceleration in response to withdrawal or rewinding of the webbing.

2. The seatbelt webbing lock preventing apparatus as claimed in claim 1, in which;

the friction spring comprises a coupling portion; and the retainer includes a ring portion comprising a ring portion having an inner tooth portion, and a supporting portion disposed within the ring portion and engaging the coupling portion.

3. The seatbelt webbing lock preventing apparatus as claimed in claim 2, in which;

the coupling portion is in the form of a symbol Ω of Ohm.

4. The seatbelt webbing lock preventing apparatus as claimed in claim 3, in which;

the friction spring is a wire spring or a leaf spring.

* * * * *